US012793465B2

(12) United States Patent
Islam et al.

(10) Patent No.: US 12,793,465 B2
(45) Date of Patent: Nov. 10, 2026

(54) FACE RECOGNITION METHOD

(71) Applicant: BAHCESEHIR UNIVERSITESI, Besiktas/Istanbul (TR)

(72) Inventors: Md Baharul Islam, Besiktas/Istanbul (TR); Masum Shah Junayed, Besiktas/Istanbul (TR); Arezoo Sadeghzadeh, Besiktas/Istanbul (TR)

(73) Assignee: BAHCESEHIR UNIVERSITESI, Besiktas/Istanbul (TR)

( * ) Notice: Subject to any disclaimer, the term of this patent is extended or adjusted under 35 U.S.C. 154(b) by 257 days.

(21) Appl. No.: 18/838,702

(22) PCT Filed: Feb. 13, 2023

(86) PCT No.: PCT/TR2023/050135
§ 371 (c)(1),
(2) Date: Aug. 15, 2024

(87) PCT Pub. No.: WO2023/158408
PCT Pub. Date: Aug. 24, 2023

(65) Prior Publication Data

US 2025/0157253 A1 May 15, 2025

(30) Foreign Application Priority Data

Feb. 16, 2022 (YE) ............................... 2022/002073

(51) Int. Cl.
*G06K 9/00* (2022.01)
*G06V 10/26* (2022.01)
(Continued)

(52) U.S. Cl.
CPC .......... *G06V 40/172* (2022.01); *G06V 10/273* (2022.01); *G06V 10/30* (2022.01);
(Continued)

(58) Field of Classification Search
CPC .... G06V 40/172; G06V 10/273; G06V 10/30; G06V 10/774; G06V 10/82;
(Continued)

(56) References Cited

U.S. PATENT DOCUMENTS 9,251,402 B2 * 2/2016 Sun ........................ G06V 40/16
10,013,630 B1 * 7/2018 Brendel .............. G06F 16/5838
(Continued)

FOREIGN PATENT DOCUMENTS

CN 112070015 12/2020
CN 112418177 2/2021
(Continued)

OTHER PUBLICATIONS

Hariri et al ("Deep and Shallow Covariance Feature . . . ", Computer Science > Computer Vision and Pattern Recognition, Journal of Latex Class Files, May 12, 2021 (Year: 2021).*
(Continued)

*Primary Examiner* — Shervin K Nakhjavan
(74) *Attorney, Agent, or Firm* — Shichrur & Co.

(57) ABSTRACT

The present invention relates to a face recognition method that enables to recognize masked and non-masked faces with high accuracy.

3 Claims, 1 Drawing Sheet

(a) (b)

(51) Int. Cl.

| | |
|---|---|
| ***G06V 10/30*** | (2022.01) |
| ***G06V 10/774*** | (2022.01) |
| ***G06V 10/82*** | (2022.01) |
| ***G06V 40/16*** | (2022.01) |

(52) U.S. Cl.
CPC ............ *G06V 10/774* (2022.01); *G06V 10/82* (2022.01); *G06V 40/161* (2022.01); *G06V 40/168* (2022.01)

(58) Field of Classification Search
CPC ...... G06V 40/161; G06V 40/168; G06N 3/09; G06N 3/048; G06N 20/10; G06N 3/0464; G07C 9/37
See application file for complete search history.

(56) References Cited

U.S. PATENT DOCUMENTS

| | | | | |
|---|---|---|---|---|
| 12,028,525 | B2 * | 7/2024 | Besenbruch | G06N 3/084 |
| 12,099,357 | B1 * | 9/2024 | Ebrahimi Afrouzi | B60R 25/252 |
| 12,122,392 | B2 * | 10/2024 | Ren | A61B 5/0077 |
| 12,308,014 | B2 * | 5/2025 | Savchenkov | G10L 13/08 |
| 2019/0236371 | A1 * | 8/2019 | Boonmee | G06V 10/764 |
| 2022/0067521 | A1 * | 3/2022 | Chen | G06V 40/171 |
| 2022/0108101 | A1 * | 4/2022 | Bui | G06F 18/2155 |
| 2022/0327861 | A1 * | 10/2022 | Yang | G06V 40/161 |

FOREIGN PATENT DOCUMENTS

| | | | |
|---|---|---|---|
| CN | 113947803 | 1/2022 | |
| CN | 113963183 | 1/2022 | |
| WO | WO-2021231900 A1 * | 11/2021 | G06V 40/162 |
| WO | 2021258588 | 12/2021 | |

OTHER PUBLICATIONS

Junayed et al ("Deep Covariance Feature and CNN-based End-to-End Masked Face Recognition", 2021 16th IEEE International Conference on Automatic Face and Gesture Recognition (FG 2021). (Year: 2021).*

International Search Report and the Written Opinion for International Application No. PCT/TR2023/050135, mailed on May 2, 2023, 9 pages.

Search Report for Turkish Application No. 2022 002073, mailed on Feb. 16, 2022, 4 pages.

Junayed M.S. et al., Deep Covariance Feature and CNN-based End-to-End Masked Face Recognition, 2021 16th IEEE International Conference on Automatic Face and Gesture Recognition, Dec. 2021, 9 pages.

* cited by examiner

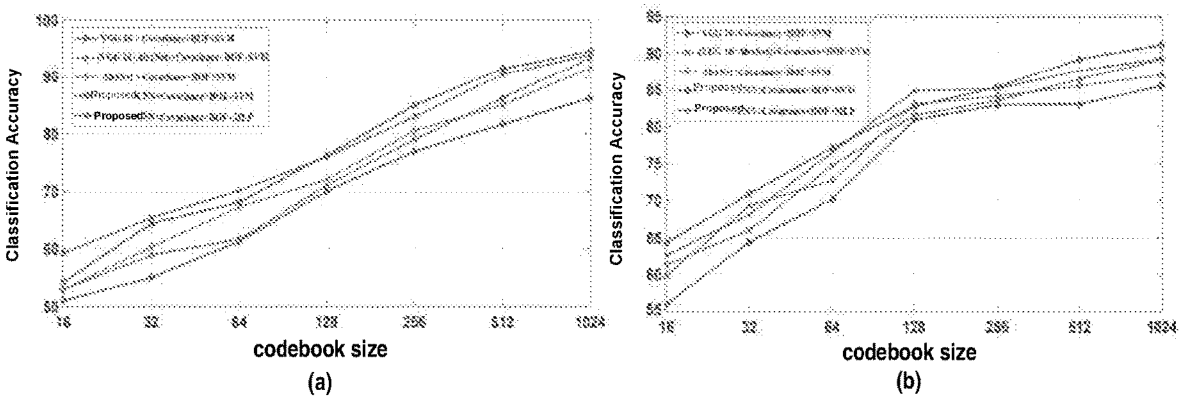
(a) (b)

FACE RECOGNITION METHOD

TECHNICAL FIELD OF THE INVENTION

The present invention relates to a face recognition method that enables to recognize masked and non-masked faces with high accuracy.

STATE OF THE ART

Face recognition has been the topic of interest for researchers in the field of artificial intelligence and computer vision and achieved significant improvements over the last four decades. It has been extensively applied on different applications such as surveillance control, facial attendance, border control gates, entrance into/exit from public communities, facial security check at the airports and train stations, etc. Its importance has been highlighted during the COVID-19 pandemic as a reliable, safe identity verification system in authentication applications because it is contactless. In contrast, the unlocking and surveillance systems based on passwords and other biometrics such as fingerprints (which require the user contact) have the danger of spreading the virus and are unsafe for people's health.

The conventional face recognition approaches perform successfully and accurately in a controlled environment. However, they suffer from extreme degradation in their accuracy in uncontrolled and challenging environments, including illumination variations, pose variations, facial expressions, and occlusion. Among these challenges, occlusion is the most affecting issue, and the difficult one to deal with since the obscured areas cannot be easily reconstructed. There are various occlusion objects (e.g., eyeglasses, hats, hair, masks) on different areas of the face (e.g., eyes, nose, and mouth). Mask is one of the particular occlusion objects as a facial mask covers 50-80% of a face.

In addition to direct contact, airborne transmission (i.e., human breath) is another method of spreading COVID-19 virus infection. Consequently, people around the world are forced to wear facial masks in public places to mitigate the COVID-19 virus's spread (by around 65%) and keep the pandemic under control. This fact affects the performance of the existing conventional face recognition techniques and increases their error rate by 20-50% according to the published report of NIST2020. In this case, it is necessary to take off the masks for automatic face recognition based on conventional techniques or personal identification scenarios. Even the mask is removed for a few minutes in public places such as airports and automatic border control gates, the COVID-19 virus can be quickly spread on the air and bring other people's health at risk.

Generally, masked face recognition (MFR) systems suffer from three significant limitations. Firstly, there is a lack of large-scale training and test data with masks for MFR, especially for deep learning-based algorithms. So, millions of masked faces must be collected and annotated for training, which is time and energy consuming. Secondly, wearing masks damage the mouth and nose features, so the final available features are insufficient for identification. Thirdly, detecting the face under the mask occlusion is challenging. Additionally, training the system with the masked data but testing it with non-masked data and vice versa also can reduce the system's performance. For example, suspects cannot be identified by security personnel based on traditional facial recognition systems trained with non-masked data. Also, the highest accuracy rate reported for face recognition system in the literature is around 92%, which is significantly lower than traditional occlusion-free face recognition systems. Hence, it is vital to provide a face recognition system with improved performance.

In the state of the art, the invention of the application number with "CN103473535" provides a real-time face recognition system with a good performance on a light-weight platform. This system also includes facial expression recognition and facial make-up processing modules. However, it only works on normal (uncovered) faces, and when it is used on the faces covered with a mask, its recognition rate is greatly reduced.

In the state of the art, the invention of the application number with "CN111860453" focuses to solve the difficulty of performing face recognition on a person wearing a mask in an epidemic environment. In the invention, the pre-processing step is applied gray-scale conversion, normalization, and changing the occluded part (means mask) into black. However, a Gaussian smoothing filter is not applied to remove noise and jagged edges, and a cropping filter is not applied to remove masked regions and occluded free parts of the face. In this case, in the training phase, the invention cannot perform efficiently to recognize both faces (masked/non-masked) since only the eyes and forehead are not used for recognition (their systems depend on the mask and change color to black on the training set).

Consequently, it is of great importance to have an automatic, robust face recognition method to recognize masked and non-masked faces with high accuracy.

Consequently, the disadvantages disclosed above and the inadequacy of available solutions in this regard necessitated making an improvement in the relevant technical field.

OBJECTS OF THE INVENTION

The present invention relates to a face recognition method that enables to recognize masked and non-masked faces with high accuracy.

The most important object of the present invention is that it uses eyes and forehead for face recognition. Therefore, no matter the training phase is carried out with the masked faces or/and with non-masked faces, the system can recognize both faces in the testing phase. This proves the accuracy of the system against mask (or any other nose and mouth cover) occlusion.

Another object of the present invention is that it can also overcome the challenge of collecting or synthesizing many masked faces for training.

Another object of the present invention is that instead of making an effort to reconstruct the occluded areas of the face by mask, i.e., nose and mouth, it entirely omits the negative impact of the damaged regions and makes full use of occlusion-free areas in the faces. Therefore, only the upper areas of the face, i.e., eyes and forehead, are utilized for feature extraction and recognition instead of reconstructing and synthesizing the occluded regions. It can reduce the computational cost since reconstructing the large occluded areas of the faces are challenging and costly.

Another object of the present invention is evaluating the system based on two dataset of RMFRD (Real-world Masked Face Recognition Dataset) and SMFRD (Simulated Masked Face Recognition Dataset).

Another object of the present invention is applying a smoothing filter. This allows to eliminate noise and jagged edges to improve image quality and make the entire system robust against noise.

Another object of the present invention is extracting 68 face key points by using the Dlib-ml face key point detector to rotate the faces and make them frontal faces.

Another object of the present invention is applying shading effects for illumination variation in the training set. This makes the system resilient to lighting changes in real-world applications.

Another object of the present invention is converting RGB images to grayscale images by applying a thresholding filter. Thus, more complex operations can be performed in less time since grayscale images have smaller data.

Structural and characteristic features of the present invention as well as all advantages thereof will become clear through the attached FIGURES and the following detailed description provided by making references thereto. Therefore, the assessment should be made by taking these FIGURES and the detailed description into consideration.

DESCRIPTION OF THE FIGURES

FIG. 1 illustrates graphs showing the effect of codebook size on the performance of the proposed method on (a) RMFRD and (b) on the SMFRD, based on CNN, VGG-16, AlexNet and VGG-16+AlexNet feature extractors.

DESCRIPTION OF THE INVENTION

The present invention relates to a face recognition method that enables to recognize masked and non-masked faces with high accuracy.

The present invention consists of two phases, offline and online. In the offline phase, the original training images (masked and non-masked face images) are acquired first. Then, all these input images are smoothed for noise removal and resized to the same image size. Before resizing, 68 face keypoints are extracted using Dlib-ml facial key point detector. These key points are applied for horizontal rotation of the input faces to correct the facial posture and make them frontal. This system has been proposed for real-world facial images and future test data may include various lighting conditions. Consequently, different shading effects randomly selected from 0-40% are applied to the training images to reduce the lighting condition effect and make the system robust against lighting variations. In the next step, the upper regions of the faces (i.e. forehead and eyes) are cropped as occlusion-free regions by applying a cropping filter. Since the cropping process is performed independently of the mask, it can be applied not only on masked faces, but also to non-masked faces or any kinds of face covers. The process followed by the cropping filter divides the input face image into 100 equal blocks, from these blocks the first 50 blocks are selected as the occlusion-free region, and the remaining blocks are removed. Once the occlusion-free regions are extracted and converted to grayscale images, these images are used to train a CNN-based feature extractor. The results of this feature extractor are utilized in the covariance deep feature extraction which is followed by two extra layers (Bitmap and Eigenvalue) as dimensionality reduction techniques. The obtained deep covariance matrices are quantized to codebooks which are concatenated based on Bag-of-Features (BoF) paradigm. Finally, the histogram of these codebooks is used for classification in an SVM (Support Vector Machine) classifier. The input of this classifier is the histogram information, and the outputs are the corresponding class labels (names of the people). Once, the CNN (Convolutional neural network) based feature extractor is trained, it can be used in any surveillance applications at the border gates such as airports. Now, the face image of any person, e.g., the passengers (masked or non-masked) who board the plane for passport checking, is captured by a camera, and then fed into our system. For any input probe image, a preprocessing step (noise suppression, face pose rotation, resizing, cropping and grayscale conversion) is performed. The preprocessed image is fed into the CNN feature extractor and the SVM classifier, however, this time there is no need to spend time on training. In this step, the input image is recognized in real-time with an accuracy of 94.01% based on the trained weights and model parameters.

In addition to the CNN-based feature extractor, which is the subject of the present invention, two modified extractors are also investigated: VGG-16 and AlexNet. VGG-16 consists of several layers such as convolution (13 layers), Max Pooling (5 layers), activation function and fully connected layers (5 layers), among that the 16 layers are weight layers. Another deep neural network being investigated is AlexNet that has eight trained layers (i.e., five convolution layers and three fully connected layers), the last fully connected layers are defined for classification tasks. AlexNet is used only as a feature extractor, not as a classifier. The fifth convolutional layer is used to extract deep facial features. The features extracted from our proposed CNN model and two other pre-trained models are used for deep covariance feature extraction. The size of the final covariance features is reduced by applying the BitMap (bitmap) and Eigenvalue (eigenvalue) techniques. The combined covariance matrices are quantized into codebooks which are concatenated using the BoF paradigm and represented as a histogram. The final classification is performed by two different classifiers, SVM and MLP.

The full evaluation of the proposed method based on the CNN feature extractor with two different optimizers and two classifiers is presented in Table 1 on both the RMFRD and SMFRD datasets in terms of accuracy, sensitivity, and specificity.

TABLE 1

Comparing the performance of the proposed feature extractor with other pre-trained feature extractors with different optimizers on RMFRD and SMFRD datasets

| Feature | | | Accuracy (%) | | Sensitivity (%) | | Specificity (%) | |
|---|---|---|---|---|---|---|---|---|
| Extractor | Optimizer | Classifier | RMFRD | SMFRD | RMFRD | SMFRD | RMFRD | SMFRD |
| VGG-16 | SGD | MLP | 91.28 | 87.44 | 89.42 | 87.85 | 92.98 | 87.04 |
| | | SVM | 91.32 | 88.99 | 89.52 | 87.72 | 92.16 | 90.27 |
| | ADAM | MLP | 91.78 | 89.43 | 90.38 | 88.50 | 93.04 | 90.35 |
| | | SVM | 91.32 | 89.08 | 91.09 | 88.39 | 91.53 | 89.74 |

TABLE 1-continued

Comparing the performance of the proposed feature extractor with other pre-trained feature extractors with different optimizers on RMFRD and SMFRD datasets

| Feature | | | Accuracy (%) | | Sensitivity (%) | | Specificity (%) | |
|---|---|---|---|---|---|---|---|---|
| Extractor | Optimizer | Classifier | RMFRD | SMFRD | RMFRD | SMFRD | RMFRD | SMFRD |
| AlexNet | SGD | MLP | 91.24 | 89.43 | 90.91 | 88.39 | 91.53 | 90.43 |
| | | SVM | 91.74 | 89.87 | 91.92 | 90.00 | 91.60 | 89.74 |
| | ADAM | MLP | 91.71 | 90.27 | 91.00 | 90.00 | 92.31 | 90.52 |
| | | SVM | 92.20 | 90.67 | 91.92 | 90.83 | 92.44 | 90.52 |
| Proposed | SGD | MLP | 92.63 | 90.99 | 93.75 | 92.45 | 91.74 | 89.66 |
| Method | | SVM | 93.09 | 91.67 | 92.93 | 93.40 | 93.22 | 90.52 |
| | ADAM | MLP | 93.55 | 91.89 | 93.00 | 95.10 | 94.55 | 89.17 |
| | | SVM | 94.01 | 92.34 | 94.85 | 93.46 | 93.33 | 91.30 |

The results are compared with the results of the pre-trained models. Comparing the results of VGG-16 and AlexNet, our proposed method achieves the highest accuracy (94.01% for RMFRD and 92.34% for SMFRD), sensitivity (94.85% for RMFRD and 95.10% for SMFRD), and specificity (94.55% for RMFRD and 91.30% for SMFRD). Overall, our proposed model based on the CNN feature extractor outperforms other pre-trained feature extraction models. Additionally, the number of layers and training parameters in our proposed CNN model are less than those of pre-trained models. By comparing all the results in this table, it made inferences that the Adam optimizer in three deep neural networks outperforms SGD. The Adam is an extension of SGD, which is widely used in deep learning applications in computer vision.

To deeply analyze the method's effectiveness, the influence of the codebook size on the accuracy of the MFR system (classification rate) is investigated. Experiments were performed for seven codebook sizes (16, 32, 64, 128, 256, 512, 1024). In face recognition, if a codebook is large enough, sufficient discriminant power is provided. Increasing the codebook size causes to provide improved performance of the histogram. FIG. 1 illustrates graphs showing the effect of codebook size on the performance of the proposed method on (a) RMFRD and (b) on the SMFRD, based on CNN, VGG-16, AlexNet, and VGG-16+AlexNet feature extractors. The proposed CNN feature extractor (with Adam optimizer and highest accuracy SVM classifier) for our proposed system is analyzed together with two pre-trained feature extractors using Covariance and BoF. Experimental results on RMFRD and SMFRD are plotted in FIG. 1. The graphs as illustrated in FIG. 1 show that the codebook size of 1024 produces the highest accuracy in the combination of CNN+covariance+BOF+SVM. The system has the lowest accuracy for the pre-trained VGG-16 model of all codebook sizes. A combination of VGG-16 and AlexNet as a hybrid feature extractor is tested to evaluate the effect of codebook size for integrated feature extractors. It shows that with a combination of two deep pre-trained models, the performance of the MFR system is quite the same as the AlexNet feature extractor with slightly higher accuracy. The face recognition method of the present invention defines the codebook size as 1024 since it provides the highest accuracy for both data sets. Comparison of the performance of our proposed method and the other state of the art methods on RMFRD and SMFRD datasets is given in Table 2.

TABLE 2

Performance comparison of other state-of-the-art methods on RMFRD and SMFRD datasets

| | | Accuracy (%) | |
|---|---|---|---|
| Approaches | Methods | RMFRD | SMFRD |
| Luttrel et al [1] | Transfer Learning | 85.7 | 83.3 |
| Almabdy et al [2] | CNN + SVM | 87.0 | 86.1 |
| Hariri et al [3] | CNN + BoF + MLP | 91.3 | 88.9 |
| Proposed Method | CNN + Covariance + BoF + SVM | 94.01 | 92.34 |

In the working method of the present invention, first, the CNN-based feature extractor is trained. This step is the training phase of the system, and it is performed once, and then the trained system can be used in real world applications. The original training images (whether masked or non-masked face images) are taken first.

All input images are passed through a smoothing filter to remove noise (if any noise occurs during image acquisition) and jagged edges, thereby improving the quality of images and making the entire system robust against noise. After applying the smoothing filter, 68 face key points are extracted by using the Dlib-ml face key point detector. The 68 face key points are some selected points on the faces based on the Dlib-ml face key point detector. These key points are applied for the two-dimensional horizontal rotation of the input faces to correct the facial posture and make them from the frontal. These horizontally rotated faces are then normalized and resized to 240×240 pixels. This system has been proposed for real-world facial images, and the future test data may include various lighting conditions. As a result, different shading effects randomly selected from 0-40% are applied to the training images to reduce the lighting condition effect and make a system robust against lighting variations.

Then, a cropping filter is then applied to these enlarged images. They are divided into 100 blocks with a fixed size of 24×24 pixels. The first 50 blocks (half of the image) are selected and the top region is cropped and the rest is removed. Since the cropping process is performed independently of the mask, it can be applied not only to masked faces, but also to non-masked faces or all kinds of face covers. After the removal, the occlusion-free regions are converted to grayscale images. More complex operations can be performed in less time since grayscale images have smaller data.

When occlusion-free regions are extracted and converted to grayscale image, they are used to train a CNN-based feature extractor. The results of this feature extractor are used in covariance deep feature extraction followed by two extra layers (Bitmap and Eigenvalue) as dimension reduction. The resulting deep covariance matrices are quantized into codebooks that are assembled based on the Bag-of-Features paradigm. Finally, the histogram of these codebooks is used for classification in an SVM classifier. The input of this classifier is histogram information, and its outputs are the relevant class labels (names of the people). The CNN-based feature extractor is trained once, it can be used in any surveillance application at border gates such as airports.

Codebooks are sets of values calculated with the help of vector quantization algorithm. Codebooks are typically created from a set of training images by using a standard clustering algorithm such as k-means. This works well for texture analysis on images including only a few homogeneous regions and is generally sufficient for key point-based representations. Visual codebooks of features extracted from native image patches are an efficient way to capture image statistics for texture analysis and scene classification.

Once the CNN-based feature extractor is trained, the facial image of any person is recorded with the camera for example, the passengers of an airplane (masked or non-masked) for passport control. The input probe image is passed through smoothing and resizing steps. Regions that are not covered by the cropping filter are cropped and RGB images are converted to grayscale. The processed image is fed to the deep learning-based feature extractor and SVM classifier, but this time there is no need for training and the person in the input image is recognized in real time. After the face in the input image is acquired by our system, it is used by the face recognition method of the present invention, to allow or deny the person's entrance. This facial recognition system is mainly used in border gate control to maintain and improve safety and security in a cost-effective way by saving manpower. For example, the image captured at airports is compared with the passport images recorded in the dataset for face recognition. That is, if the recognized face does not have an illegal problem or a visa expiration problem, that person is allowed to enter a country. It can even be used as an authentication system in offices. If a visitor in an office is perceived by this system as a staff member of that office, that person is granted access to that office.

The invention claimed is:

1. A face recognition method characterized by comprising the process steps of;

Training a CNN-based feature extractor,

Transmitting a face image of a masked or non-masked person taken by a camera to a processor, Smoothing and resizing the face image taken by the camera, Cropping occlusion-free regions in the resized image followed by converting RGB images to grayscale, Extracting image attributes by CNN-based feature extractor and quantizing deep covariance matrices into code books when the occlusion free regions are extracted and converted to grayscale images, Detecting the name of the person in the image by using a code book histogram in an SVM classifier for classification, Determining whether the person detected in the image is allowed to enter or not, all of which are run on the processor.

2. A face recognition method according to claim 1, is characterized in that, in the process step of training a CNN-based feature extractor comprises the process steps of;

Taking face images that are both masked and non-masked,

Applying a smoothing filter on the images to remove noise and jagged edges,

Extracting 68 face key points using a facial key point detector,

Making two-dimensional horizontal rotation of the entrance faces correcting the facial pose in these key points, Normalizing the two-dimensional horizontal rotated face images and resizing to 240×240 pixels, Applying randomly selected different shading effects to the resized images, Dividing the images into 100 blocks of 24×24 pixels, Cropping the top region of the selected first 50 blocks and removing the rest, Extracting and converting occlusion free regions into grayscale images and training the CNN-based feature extractor, Using the results of the feature extractor for deep covariance feature extraction followed by extra layers of eigenvalue and bitmap for dimensionality reduction, Quantizing the obtained deep covariance matrices into codebooks that concatenated based on the BoF paradigm, Using code book histogram in an SVM classifier for classification.

3. A face recognition method according to claim 1 or claim 2, is characterized in that, in the process step of applying randomly selected different shading effects to the resized images comprising applying different shading effects randomly selected from 0-40% to images in the training method.

* * * * *